United States Patent [19]
DePalma et al.

[11] Patent Number: 5,491,038
[45] Date of Patent: *Feb. 13, 1996

[54] CONTACT RING FOR ON-CELL BATTERY TESTER

[75] Inventors: Christopher L. DePalma, Framingham; William T. McHugh, Westwood; Sean A. Sargeant, Westford; Marian Wiacek, Holliston, all of Mass.; Robert A. Yoppolo, Woonsocket, R.I.

[73] Assignee: Duracell Inc., Bethel, Conn.

[*] Notice: The term of this patent shall not extend beyond the expiration date of Pat. No. 5,250,905.

[21] Appl. No.: 295,314

[22] Filed: Aug. 24, 1994

[51] Int. Cl.$^6$ .................................................. H01M 10/48
[52] U.S. Cl. ............................... 429/91; 429/93; 340/636
[58] Field of Search .............................. 429/90–93, 61; 340/636; 324/426, 435

[56] References Cited

U.S. PATENT DOCUMENTS

| | | | |
|---|---|---|---|
| 3,218,197 | 11/1965 | Carmichael et al. | 136/133 |
| 3,219,488 | 11/1965 | Southworth | 136/133 |
| 3,764,893 | 10/1973 | Weigand | 429/93 X |
| 4,075,398 | 2/1978 | Levy | 429/56 |
| 4,476,200 | 10/1984 | Markin et al. | 429/56 |
| 4,537,841 | 8/1985 | Wiacek et al. | 429/56 |
| 4,723,656 | 2/1988 | Kiernan et al. | 206/333 |
| 4,737,020 | 4/1988 | Parker | 429/93 X |
| 5,080,985 | 1/1992 | Wiacek et al. | 429/172 |
| 5,150,602 | 9/1992 | Payne et al. | 29/623.2 |
| 5,156,931 | 10/1992 | Burroughs et al. | 429/93 |
| 5,188,231 | 2/1993 | Kivell et al. | 206/333 |
| 5,223,003 | 6/1993 | Tucholski et al. | 429/93 X |
| 5,227,261 | 7/1993 | Georgopoulos | 429/56 |
| 5,231,356 | 7/1993 | Parker | 429/91 X |
| 5,250,905 | 10/1993 | Kuo et al. | 324/435 |

FOREIGN PATENT DOCUMENTS

0523901A1  1/1993  European Pat. Off. ........ H01M 10/48

*Primary Examiner*—Anthony Skapars
*Attorney, Agent, or Firm*—Ronald S. Cornell; Barry D. Josephs

[57] ABSTRACT

An electrochemical cell having an on-cell tester for visually indicating the condition of the cell is provided with an electrically conductive metal ring pressed onto the negative terminal at the crimp seal end of the cell, to permit the tester lead to make an electrical contact with the negative terminal without shorting across the positive terminal of the cell. The ring has a cylindrical wall portion or gripping means which frictionally grips a corresponding mating cylindrical wall potion on the negative terminal and also has a flange portion adjacent the positive terminal. A layer of electrically insulating material disposed between the flange and positive terminal prevents electrical contact between the terminals. The tester lead is either permanently electrically connected to the ring or intermittently connected by the user, depending on the type of tester used.

21 Claims, 5 Drawing Sheets

CONTACT RING FOR ON-CELL BATTERY TESTER

BACKGROUND OF THE INVENTION

1. Field of the Invention

This invention relates to an electrical contact ring for an electrochemical cell having an on-cell tester. More particularly, this invention relates to a contact ring for an electrochemical cell, such as a primary alkaline cell, having an on-cell tester to electrically connect one lead of the tester to the negative end terminal of the cell, and to a cell having such tester and contact ring.

2. Background of the Disclosure

The use of thermochromic voltage testers to visually indicate the condition of an electrochemical cell, commonly referred to as a battery, has become very popular and provides a value added advantage to the battery manufacturer and to the consumer. These testers are used with primary electrochemical cells, although they can also be used by consumers to test the condition of a secondary or rechargeable electrochemical cell if desired. The most popular tester presently in use is a thermochromic material in contact with an electrical resistance element which forms an integral part of a battery package in which the batteries are alkaline primary cells. The user places the terminals of the cell between the contacts of the tester and squeezes the contact ends of the tester to make electrical contact with the ends of the cell. The resistance element of the tester is heated in proportion to the cell voltage and the thermochromic material provides a qualitative indication of the condition of the cell over a range indicating "good" or "replace". This kind of tester is disclosed, for example, in U.S. Pat. No. 4,723,656. An integral, thermochromic package tester which can also be removed from the package is disclosed in U.S. Pat. No. 5,188,231. More recently, on-cell testers have been developed in which the cell condition indicator is an integral part of the cell label. These on-cell testers include both the thermochromic type and a new, electrochemical type of tester. An example of a thermochromic type of on-cell tester i disclosed in European Patent Publication No. 0 523 901 A1, the disclosure of which is incorporated herein by reference and which was published on Jan. 20, 1993. Unlike the thermochromic type which employs a resistance element to produce heat and which can therefore not be permanently attached to the terminals of the cell without continuously discharging it, the new electrochemical type does not draw current from the cell and can therefore be permanently, attached to the terminals of the cell without discharging the cell. This new type of tester is disclosed in U.S. Pat. No. 5,250,905. In either case, there is a need for a means to connect an on-cell tester to the negative end terminal without shorting across the end of the metal cell container which is the positive terminal.

SUMMARY OF THE INVENTION

The present invention relates to an electrochemical cell having a positive and a negative terminal, an on-cell tester for visually indicating the condition of the cell, said tester having at least one lead, and an electrically conductive contact ring for making an electrical connection between the tester lead and one of the cell terminals on which the ring is mounted and electrically connected to. The contact ring comprises a flange disposed adjacent the other terminal to which the ring is not electrically connected, and electrical insulating means is disposed between the flange and other terminal to prevent an electrical connection between them. The tester lead is disposed adjacent the flange for making electrical contact thereto, either permanently or intermittently by the user, depending on the type of on-cell tester. By on-cell tester is meant a tester which visually indicates the cell condition and is permanently attached to the cell either by means of the cell label or other means. In the context of the invention an on-cell tester includes a type which draws current from the cell, such as a thermochromic type disclosed in European Patent Publication No. 0 523 901 A1 which, if permanently electrically connected to both cell terminals would continuously drain and ultimately discharge the cell, and also to a type which does not draw current from the cell such as the electrochemical type disclosed in U.S. Pat. No. 5,250,905 which can be permanently connected in parallel to both cell terminals without discharging the cell.

In one embodiment, the contact ring comprises a metal collar or ring on the metal end cap which is the negative terminal of the cell, with a portion of the ring extending radially outward in a flange, the bottom of which is adjacent the crimped-over end of the metal can which is the positive cell terminal, at the top of the cell seal. The bottom of the flange is electrically insulated from the crimped-over end of the metal can by means of an electrically insulating material which is (i) an integral part of the flange as a coating or layer, (ii) a separate washer, or (iii) a separate ring generally shaped like the metal ring disposed between the bottom of the flange and the end of the metal can. The inner periphery of the flange terminates in a gripping means for frictionally gripping the negative terminal, by which means the ring also makes mechanical and concomitant electrical contact with said terminal. The negative terminal lead of the on-cell tester is generally permanently electrically connected to the negative cell terminal by means of the contact if the tester is of the type which does not continuously drain the cell, such as an electrochemical type of tester. Alternately, if the tester is of a type which will continuously drain the cell, such as a thermochromic tester, thereby discharging it if permanently electrically connected to both the positive and negative cell terminals, then the negative terminal lead of the tester will be disposed adjacent the contact ring, but not in contact with the ring, so that the consumer can make and break the electrical contact at will to check the cell condition without continuously draining the cell. The tester is connected-to the positive cell terminal by any suitable means, including a separate positive terminal lead or by a portion of the tester itself, as is well known to those skilled in the art.

Other advantages of the contact ring of the invention are that it prevents defective or improper external cell contacts from shorting the positive and negative terminals at the crimp seal end of the cell and it also provides a barrier against expulsion of the cell's internal chemical components under abuse conditions.

DETAILED DESCRIPTION

Figure 1A:
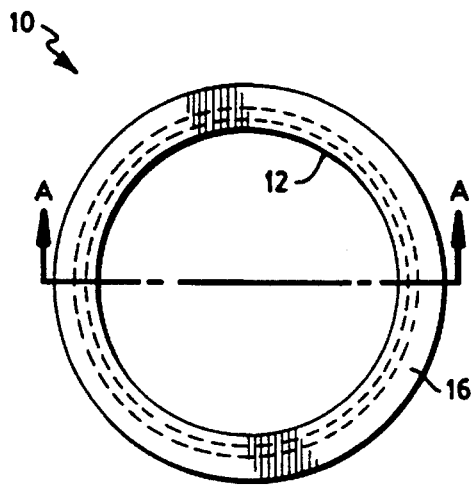
FIGS. 1(a) and 1(b) schematically illustrate a respective top view, and a cross-sectional of a contact ring of the invention.
Figure 1B:
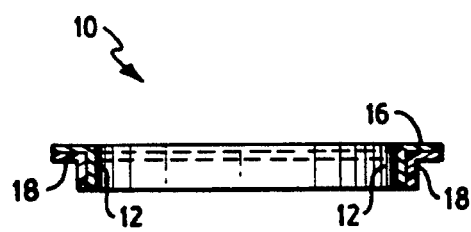

FIGS. 1(a) and 1(b) illustrate contact ring 10 as a metal collar having a cylindrical wall portion 12 at its inner periphery, the top of which terminates radially outward in a flange 16. The bottom surface of the flange is coated with an electrically insulating coating or layer 18. Coating or layer 18 is a suitable organic or inorganic material illustrative, but non-limiting examples of which include, a plastic such a nylon, an epoxy, a polyamide, a urethane; an elastomeric material including halogenated elastomers, and a ceramic such as alumina, a glass, etc., with the choice of material being left to the practitioner. In the embodiment shown in the Figures, the electrically insulating material 18 is illustrated as extending across the bottom of flange 16 and the outer surface of cylindrical wall portion 12. If desired however, the insulating material 18 is present only on the bottom surface of flange 16. The insulating material may be applied to one side of a metal blank which is then formed into the ring 10 or it may be applied after the ring is formed. In another embodiment as set forth above, electrically insulating material 18 may be in the form of a separate ring or washer (not shown) of insulating material which may or may not be pressed or bonded to ring 10 to form a composite unitary body. Further, although in the embodiment shown the ring is electrically conductive metal such as steel, it may be made of other electrically conductive materials.

Figure 2A:
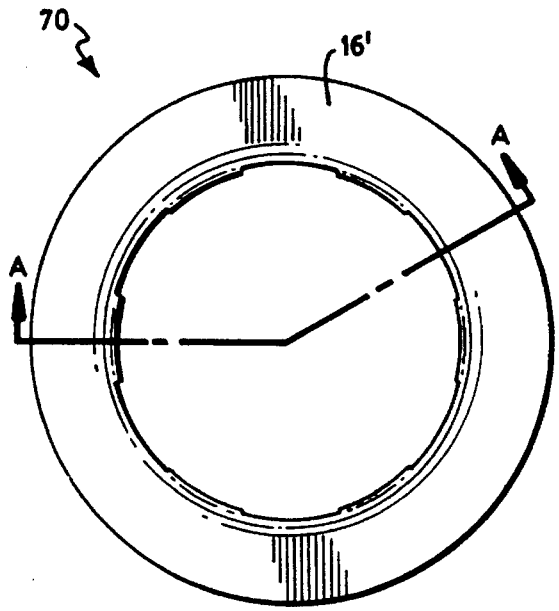
FIGS. 2(a) and 2(b) schematically illustrate a respective top view and a cross-sectional view of another embodiment of a contact ring according to the invention.
Figure 2B:
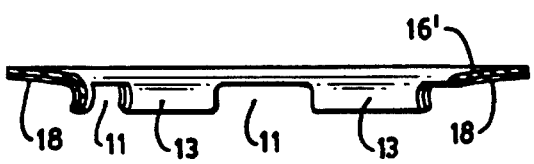
Figure 4A:
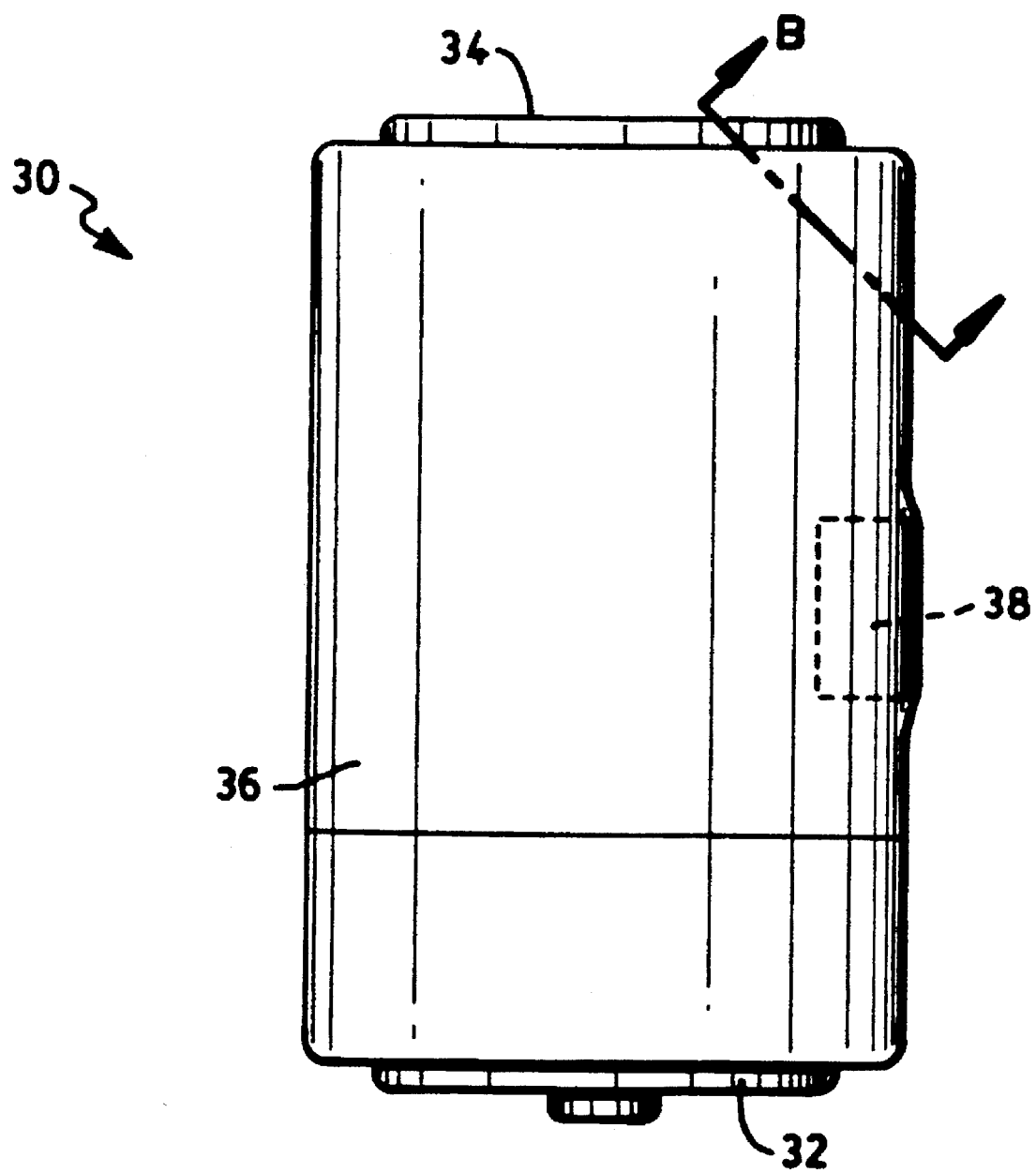
FIGS. 4(a) and 4(b) schematically illustrate the exterior and a cross section of a typical alkaline primary cell, respectively, with FIG. 4(c) schematically illustrating a cross-section of the crimp seal which includes an embodiment of the contact ring of the invention in combination with a tester lead and the positive and negative cell terminals.
Figure 4B:
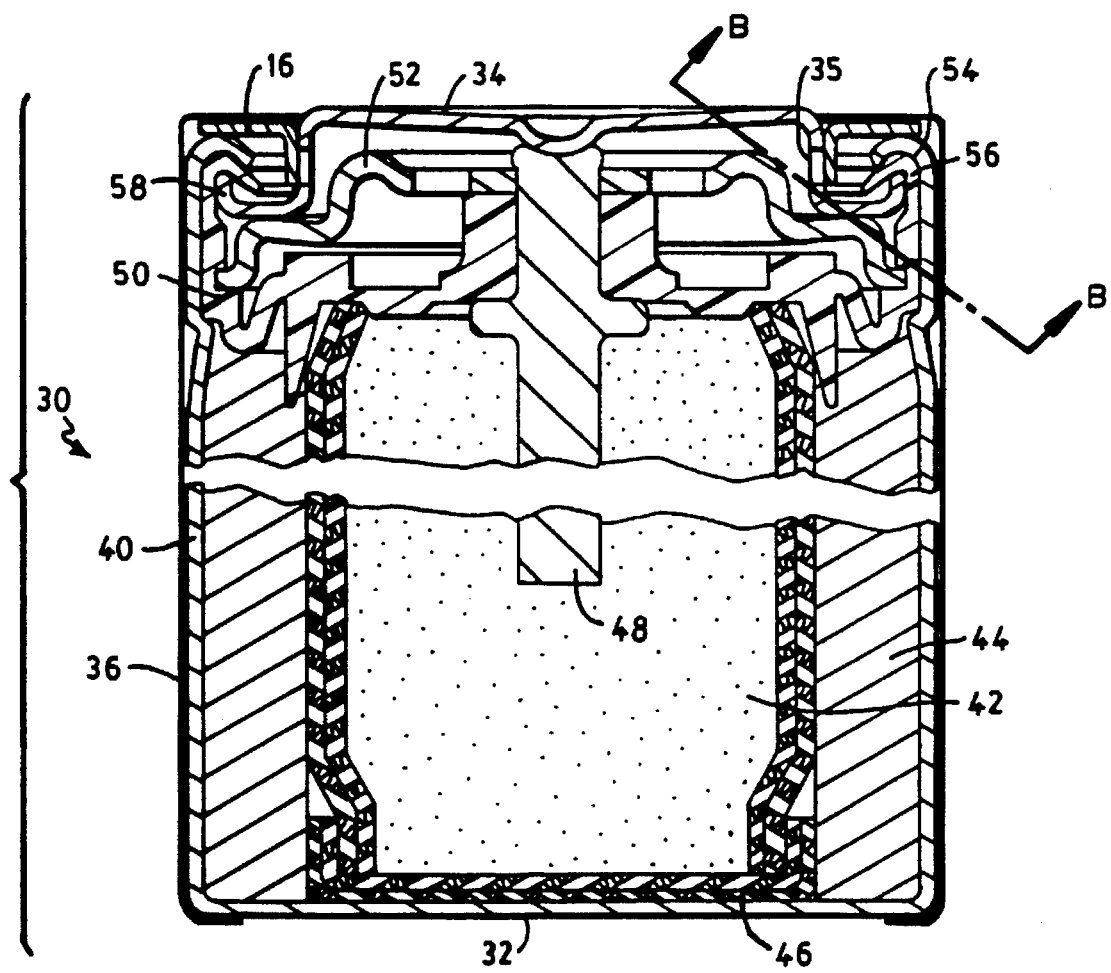
Figure 4C:
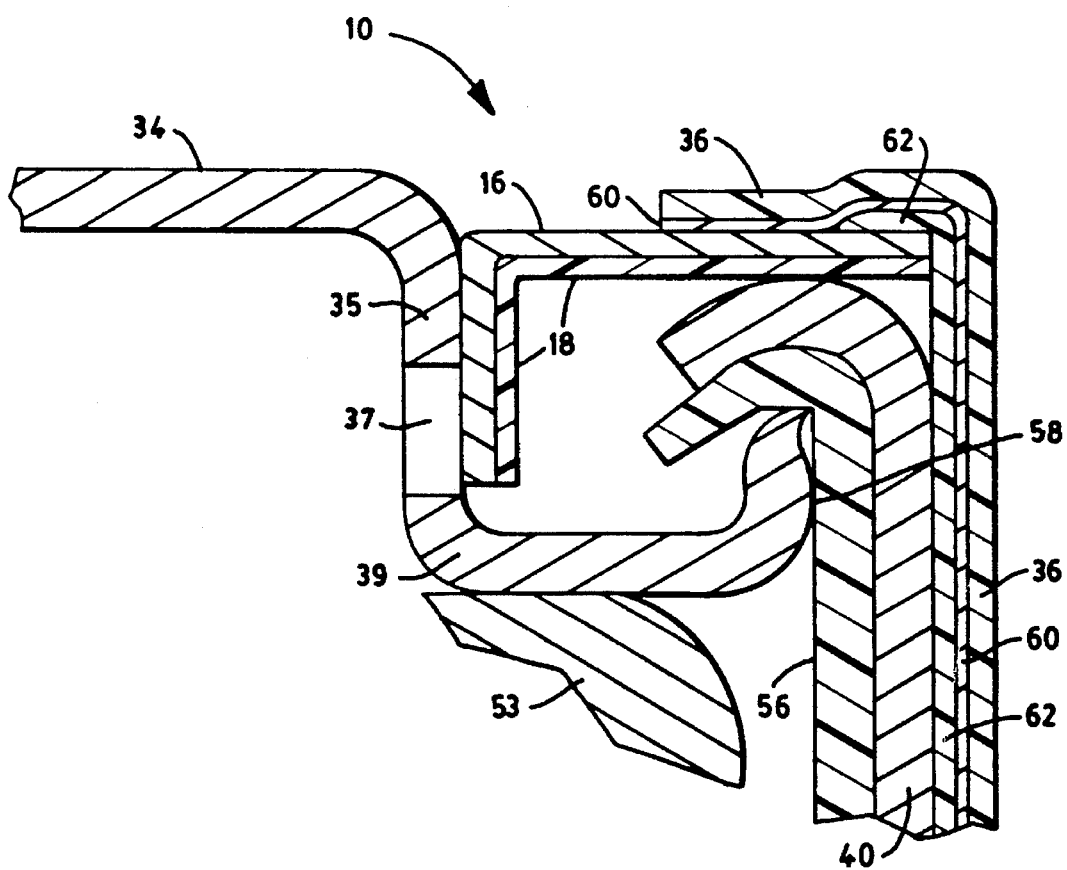

In FIGS. 2(a) and 2(b) another embodiment of a contact ring of the invention 70 is shown as a metal ring having a flange 16' which, in this embodiment (or in any other embodiment if desired) slopes slightly downward towards its center to accommodate the thickness of the on-cell tester terminal (FIG. 4(c)) without having it project beyond the end of the cell. In this embodiment, the cylindrical wall portion is broken up into a plurality of castellations 13 by cut-outs 11 as shown in FIG. 2(b) which is a schematic cross section of ring 70 taken at A—A and with the remaining castellated wall portions further curved radially outwardly so that a line or point type of contact is made with the corresponding mating wall portion of the anode end terminal. In this embodiment, the remaining wall portions 13 act as spring members or fingers to provide for greater dimensional tolerance in the manufacture of the anode end terminal and contact ring, while still maintaining the assurance of a positive mechanical contact between them. In yet another embodiment, the wall portion of the contact ring can be broken up by serrations of any suitable shape. In all of these embodiments, the contact ring can also be described as a flange whose inner periphery terminates in gripping means and particularly gripping means which comprise a plurality of projections. The electrical insulating material 18 is shown only in FIG. 2(b) for the sake of convenience.

Figure 3A:
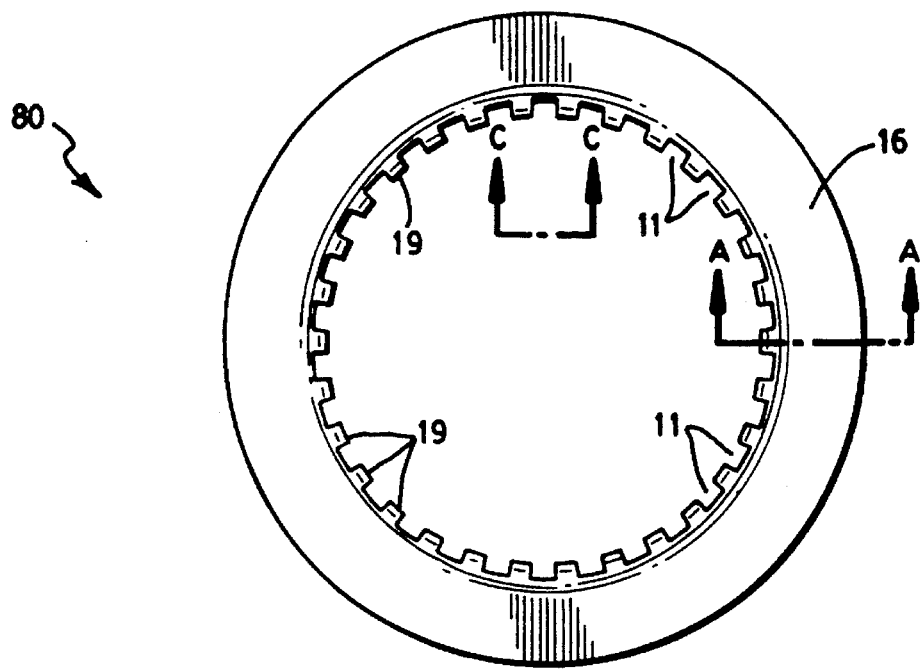
FIGS. 3(a), 3(b) and 3(c) schematically illustrate a respective top view, cross-sectional view and side view of yet another embodiment of a contact ring according to the invention.
Figure 3B:
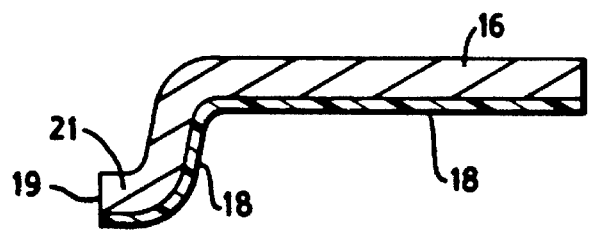
Figure 3C:
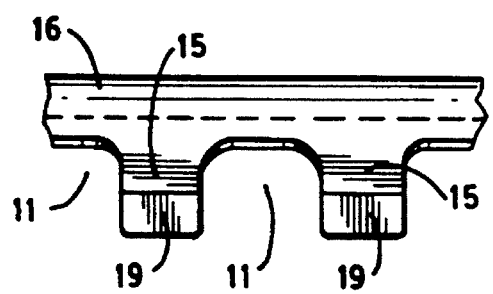

FIGS. 3(a), 3(b) and 3(c) schematically illustrate still another embodiment of a contact ring 80 of the invention, with FIG. 3(a) being a top view and FIG. 3(b) and 3(c) being cross sectional views taken at A—A and C—C, respectively. In this embodiment as with the embodiment above, the flange 16 terminates at its inner periphery in a downwardly depending, castellated cylindrical wall portion comprising a plurality of gripping projections or fingers 15 which also act as spring means for frictionally gripping a corresponding mating wall portion of the anode end terminal. However, in this embodiment the gripping means or fingers 15 each terminates radially inwardly at their bottom in an edge 21 which frictionally grips a corresponding mating portion of the anode end terminal for providing mechanical and electrical contact. Again, as with the embodiment above, the electrical insulating material is shown only in FIG. 3(b) merely for the sake of convenience.

Turning to FIG. 4(a), a cylindrical electrochemical cell 30 well known to those skilled in the art comprises a cylindrical metal container closed at one end generally shown at 32 and sealed at the other end with a seal assembly (FIG. 4(b)) terminating in a metal end cap 34 which serves as the negative terminal of the cell, and being wrapped with a label 36 under a portion of which is an on-cell tester generally illustrated at 38. FIG. 4(b) schematically illustrates a cross section of a typical primary alkaline cell 30 which comprises a cylindrical metal container 40 which is the positive terminal of the cell, closed at one end and sealed at its other end with a seal assembly as shown in the Figure. Cell 30 contains a gelled zinc anode material 42 separated from an MnO2 cathode material 44 and from the bottom of metal container 40 by a cellulosic separator 46. The $MnO_2$ cathode material is in physical and concomitant electrical contact with metal container 40. Label 36 is made of an electrically insulating material (i.e., plastic film) wrapped around the outside of metal container 40 and which electrically insulates the side of the container. Metal current collector 48 electrically connects the anodic material 4.2 to the metal end cap 34 which serves as the negative terminal of the cell. The top of container 40 is sealed by a seal assembly comprising a generally wheel shaped plastic seal member 50, a metal support 52 and metal cap 34. A crimp seal is generally indicated at 54 in which the end of the metal container and the outer wall 56 of plastic seal member 50 are crimped over the outer edge 58 of metal end cap 34. A metal contact ring 10 of the invention is shown as press fit around the cylindrical wall portion 35 of end cap 34, with the electrically insulated bottom of flange 16 contacting the crimped-over end of metal container 40 at the top of the crimp seal as shown. Label 36 containing an integral on-cell tester (not shown in FIG. 4(b)) is illustrated as being wrapped over a portion of both ends of the cell, with a portion of one end of the label which includes the negative terminal lead of the tester extending over and onto the outer surface of the metal flange 16 of ring 10 and with the negative terminal lead of the tester being electrically connected to the metal flange. The electrical connection between contact ring 10 and the negative terminal lead of the tester is illustrated in greater detail in FIG. 4(c). As is known to those skilled in the art, the on-cell tester can be attached to the outside of the metal container, and overwrapped with the label or it can be an integral part of the label. The positive terminal connection of the tester to the cell may be made against the side of metal container 40.

FIG. 4(c) schematically illustrates a cross section of the seal taken at B—B in which the negative terminal lead 60 of an on-cell tester is permanently electrically connected to metal contact ring 10. The electrical connection between the tester and the positive cell terminal is not shown and may be in any convenient form, including direct contact to the metal container as mentioned above. Thus, a portion of the metal end cap negative cell terminal 34 is shown having downwardly depending cylindrical wall 35 terminating at its bottom in flange portion 39 which rests on shoulder 53 of support 52. A plurality of holes 37 in cap 34 aid in venting the cell. Metal contact ring 10 is press fit in mating engagement around the cylindrical wall portion 35 of cap 34, with the bottom of flange 16 having an electrically insulating coating 18 resting on and thereby contacting the crimped-over end of the wall of metal container 40 at the top of the seal as shown in the Figures. Thus, metal contact ring 10 makes mechanical and concomitant electrical contact with the negative end cap terminal 34, but is electrically insulated from the positive terminal 40 by electrical insulation 18. Plastic label 36 is shown having an electrically conductive lead 60 of on-cell tester 38 disposed adjacent its inner surface. Lead 60 is electrically insulated from the positive cell terminal 40 by an electrically insulating coating or layer 62 disposed between it and metal container 40. The electrically insulating coating 62 extends only slightly onto the top of contact flange 16 of contact ring 10 to permit the end of lead strip to be permanently secured in electrical contact to the top of flange 16, thereby completing an electrical circuit between the negative cell terminal and the negative terminal lead of the on-cell tester. Any suitable means may be used to achieve the electrical contact between the lead and flange.. One facile means is to use an electrically conductive adhesive or cement to permanently secure the end of lead 60 to the top of metal contact 10. In this embodiment, the on-cell tester lead 60 is illustrated as being disposed adjacent the inner surface of label 36. Also, it is not necessary for coating or layer 62 to extend onto the cylindrical wall portion of contact 10. In another embodiment (not shown) it will be appreciated that if the on-cell tester is of the thermochromic type or any other type which, if permanently connected to both the negative and positive cell terminal, would continuously drain and soon discharge the cell, lead 60 of the tester will not be in contact with contact ring 10, but will be disposed adjacent or above the surface of the flange without making contact, so that the consumer can check the condition of the cell by manually pressing the lead down to make electrical contact with the ring, thereby activating the tester, and then releasing the lead to break the electrical contact.

It is understood that various other embodiments and modifications in the practice of the invention will be apparent to, and can readily made by, those skilled in the art without departing from the scope and spirit of the invention disclosed above. Accordingly, it is not intended that the scope of the claims appended hereto be limited to the description set forth above, but rather that the claims be construed as encompassing all of the features of patentable novelty which reside in the present invention, including all features and embodiments which would be treated as equivalents thereof by those skilled in the art to which the invention pertains.

What is claimed is:

1. An electrochemical cell having a positive and a negative terminal, an on-cell tester for visually indicating the condition of the cell, said tester having at least one lead, and an electrically conductive contact ring for making an electrical connection between said lead and one of said terminals on which said ring is mounted and electrically connected to, said ring having a flange disposed adjacent said other terminal, with electrical insulating means disposed between said ring and other terminal to prevent an electrical connection therebetween, and with said tester lead disposed adjacent said flange for making electrical contact thereto.

2. A cell according to claim 1 in which said electrical insulating means comprises a coating or layer of electrically insulating material on said ring.

3. A cell according to claim 1 in which said electrical insulating means comprises a ring of electrically insulating material which is not a part of said contact ring.

4. A cell according to claim 1 in which said tester does not continuously discharge said cell and wherein said tester lead is permanently electrically connected to said contact ring.

5. A cell according to claim 1 in which said tester lead is disposed adjacent said contact ring for making contact therewith and is not electrically connected to said ring.

6. A cell according to claim 2 in which said tester lead is permanently electrically connected to said contact ring.

7. A cell according to claim 3 in which said tester lead is disposed adjacent said contact ring for making contact therewith and is not connected to said contact ring.

8. An electrochemical cell comprising a sealed, cylindrical metal container having a negative terminal at one end, a positive terminal, an on-cell tester for visually indicating the condition of the cell, and an electrically conductive contact ring for making an electrical connection between said lead of said tester and said negative terminal, wherein said metal container comprises said positive terminal and wherein said negative terminal comprises a disk shaped metal cap having a cylindrical wall portion electrically connected to, and in mating engagement with, gripping means of said contact ring, with said contact ring having a flange disposed adjacent said metal container at said negative terminal end of said cell and with electrical insulating means disposed between said ring and container to prevent an electrical connection therebetween, and wherein said tester lead is disposed adjacent said flange for making electrical contact thereto.

9. A cell according to claim 8 wherein said electrical insulating means comprises a layer of electrically insulating material on said ring.

10. A cell according to claim 8 wherein said gripping means comprises a cylindrical wall.

11. A cell according to claim 8 in which said gripping means comprises a plurality of projections.

12. A cell according to claim 11 wherein said projections terminate at one end in a radially inward projecting edge for gripping said terminal.

13. A cell according to claim 8 wherein said flange slopes downward towards its center.

14. A cell according to claim 11 wherein said projections are curved to minimize the surface area of contact with said terminal.

15. An electrochemical cell comprising a sealed, cylindrical metal container having a negative terminal at one end, a positive terminal, an on-cell tester for visually indicating the condition of the cell, and an electrically conductive contact ring for making an electrical connection between said lead of said tester and said negative terminal, wherein said metal container comprises said positive terminal and wherein said negative terminal comprises a disk shaped metal cap having a cylindrical wall portion electrically connected to, and in mating engagement with, gripping means of said contact ring, with said contact ring having a flange disposed adjacent said metal container at said negative terminal end of said cell and with electrical insulating means disposed between said ring and container to prevent an electrical connection therebetween, and wherein said tester lead is permanently electrically connected to said flange.

16. A cell according to claim 15 wherein said electrical insulating means comprises a layer of electrically insulating material on said ring.

17. A cell according to claim 15 wherein said gripping means comprises a cylindrical wall.

18. A cell according to claim 15 in which said gripping means comprises a plurality of projections.

19. A cell according to claim 18 wherein said projections terminate at one end in a radially inward projecting edge for gripping said terminal.

20. A cell according to claim 15 wherein said flange slopes downward towards its center.

21. A cell according to claim 18 wherein said projections are curved to minimize the surface area of contact with said terminal.

* * * * *